(12) United States Patent
Steiner

(10) Patent No.: US 11,988,275 B2
(45) Date of Patent: May 21, 2024

(54) DIFFERENTIAL HAVING LUBRICANT CHANNEL

(71) Applicant: DEERE & COMPANY, Moline, IL (US)

(72) Inventor: Tobias Steiner, Hainfeld (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/250,038

(22) PCT Filed: Oct. 19, 2021

(86) PCT No.: PCT/EP2021/078960
§ 371 (c)(1),
(2) Date: Apr. 21, 2023

(87) PCT Pub. No.: WO2022/089999
PCT Pub. Date: May 5, 2022

(65) Prior Publication Data
US 2024/0011553 A1  Jan. 11, 2024

(30) Foreign Application Priority Data
Oct. 28, 2020 (DE) .......................... 102020128331.8

(51) Int. Cl.
*F16H 57/04* (2010.01)
*F16H 48/08* (2006.01)
(Continued)

(52) U.S. Cl.
CPC ......... *F16H 57/0483* (2013.01); *F16H 48/08* (2013.01); *F16H 48/22* (2013.01);
(Continued)

(58) Field of Classification Search
CPC ...... F16H 57/0483; F16H 48/08; F16H 48/40; F16H 57/0424; F16H 57/0471
See application file for complete search history.

(56) References Cited

U.S. PATENT DOCUMENTS

| 7,094,172 B2 | 8/2006 | Ishikawa |
| 7,884,511 B2 | 2/2011 | Mogi et al. |

(Continued)

FOREIGN PATENT DOCUMENTS

| JP | S57 157 U | 1/1982 |
| JP | H05 106710 A | 4/1993 |
| WO | WO 2019177020 A1 | 9/2019 |

OTHER PUBLICATIONS

International Search Report in application No. PCT/EP2021/078960, dated Jan. 19, 2022, 15 pages.

*Primary Examiner* — Thomas C Diaz

(57) ABSTRACT

A differential assembly including a differential housing supporting at least a first shaft having a first gearwheel, the differential housing designed to be connected to a lubricant supply, and a rolling bearing for mounting the first shaft. A cover is fixed to the differential housing and fixes the rolling bearing to the differential housing. A circumferential first lubricant channel is formed in the differential housing on a first side of the rolling bearing. A circumferential second lubricant channel is formed between the cover and the rolling bearing on a second side of the rolling bearing. An inner third lubricant channel is formed in the differential housing and extends from the second lubricant channel within a wall of the differential housing as far as an inner side of the differential housing.

8 Claims, 2 Drawing Sheets

(51) Int. Cl.
  *F16H 48/22*  (2006.01)
  *F16H 48/40*  (2012.01)

(52) U.S. Cl.
  CPC ......... *F16H 48/40* (2013.01); *F16H 57/0424* (2013.01); *F16H 57/0471* (2013.01)

(56) References Cited

U.S. PATENT DOCUMENTS

| | | |
|---|---|---|
| 7,963,875 B2 | 6/2011 | Hilker et al. |
| 2011/0212805 A1 | 9/2011 | Hilker et al. |
| 2018/0038475 A1 | 2/2018 | Nadayoshi et al. |

DIFFERENTIAL HAVING LUBRICANT CHANNEL

CROSS-REFERENCE TO RELATED APPLICATIONS

This application is a National Stage of PCT Application No. PCT/EP2021/078960, filed Oct. 19, 2021, which claims the benefit of and priority to German Patent Application No. 102020128331.8, filed Oct. 28, 2020, which are hereby incorporated by reference.

FIELD OF THE DISCLOSURE

The disclosure relates to a differential assembly having a lubricant channel for supplying lubricant to components that are present.

BACKGROUND

Bearings of rotating components require constant lubrication in order to reduce wear and also for cooling purposes. On the one hand, bearings can be embodied in enclosed versions. These bearings are of sealed design, and the lubricant, usually in the form of bearing grease, is placed within the bearing in advance. The amount of lubricant usually depends on the intended service life and the conditions of use. Open bearings, through which the lubricant flows, are another alternative. The lubricant can be made available by an oil circuit or an oil sump.

SUMMARY

For the supply of lubricant, differentials are embodied in such a way that they have an outer, stationary housing, and a differential which is mounted therein and is supported or mounted on the stationary housing via rolling bearings. In the housing, there is usually an oil sump, into which the rotating components dip and thus ensure that lubricant is distributed in order likewise to supply the rolling bearings with lubricant.

Differentials of this type and the housings require a stable large structure and, for this purpose, require material and a complex internal structure, as a result of which these have a high weight. This is an obstacle especially to use in vehicles or mobile machines. Furthermore, immersion in the oil sump causes the lubricant to be swirled and distributed, thereby increasing the return flow time of the lubricant. Immersion causes foaming, as a result of which the lubricant level drops. For both reasons, the amount of lubricant is usually increased beyond what is necessary. This also leads to increased costs and more weight in the differential.

A differential assembly is proposed which, inter alia, solves the disadvantages mentioned.

The present disclosure is a differential assembly that has a differential housing, which is suitable for supporting at least one shaft having a gearwheel, a rolling bearing, which is suitable for mounting the shaft and is held in the differential housing, a cover, which is fixed on the differential housing and which fixes the bearing on the differential housing, wherein the differential housing is designed for connection to a lubricant supply. In the differential housing, a circumferential first lubricant channel is formed on one side of the rolling bearing, and a further circumferential second lubricant channel is formed between the cover and the rolling bearing on the other side of the rolling bearing, and an inner third lubricant channel is formed in the differential housing, which lubricant channel extends from the second lubricant channel within a wall of the differential housing as far as an inner side of the differential housing, with the result that lubricant flows from the first lubricant channel through the rolling bearing into the second lubricant channel and then through the third lubricant channel and gets into the interior of the differential housing.

The differential according to the disclosure has a lubricant circuit which flows through the rolling bearing in order to flow subsequently through a wall section of the differential housing and to reach the interior of the differential. The design of the wall section with the third lubricant channel makes it possible to dispense with a conventional outer housing. A conventional oil sump is avoided and the entire structure can be achieved with reduced weight. The rotation of the differential housing and the centrifugal force generated thereby assists the distribution of the lubricant. The rolling bearing is subjected to a continuous flow of lubricant, thereby avoiding the accumulation of abraded particles while simultaneously dissipating heat.

In a further embodiment of the disclosure, the cover has a connection to the lubricant supply.

The lubricant circuit is integrated into the cover, saving installation space. Further machining steps on the differential housing or the shaft are eliminated.

In an embodiment, the cover has a fourth lubricant channel, which carries lubricant from the connection into the first lubricant channel.

The cover makes it possible to supply lubricant to the side of the rolling bearing which faces away from the cover. In this way, a further channel in the shaft or in the differential housing is avoided. This reduces the manufacturing complexity.

In one embodiment, the lubricant is moved in the third lubricant channel by the action of centrifugal force.

By the rotation of the differential housing itself, the centrifugal force is used to guide the lubricant in the direction of the interior of the differential. The lubricant flow is thereby assisted. The provision of an oil sump can be omitted; at the same time, the differential housing can be embodied with reduced wall thicknesses.

In one embodiment of the disclosure, the differential housing is embodied with reduced wall thicknesses and/or openings which are suitable for reducing material.

By avoiding a conventional outer housing, material is saved. The omission of the oil sump makes it possible to reduce the wall thicknesses of the differential housing; in one embodiment, the structure can be designed with open wall sections, and therefore there is an open structure at these points.

In an embodiment, the differential assembly furthermore has at least one shaft having a gearwheel, and an axle with two further gearwheels, wherein the gearwheels mesh with one another, and the axle and the shaft are mounted at a 90° angle to one another in the differential housing.

The lightweight differential housing makes it possible to save material, it being possible to implement the differential technically so that it has an open structure with apertures in the differential housing. With the aid of the axle, which carries two further gearwheels meshing with the first gearwheel, the differential has a high power density.

In one embodiment, lubricant is carried to the axle by the third lubricant channel.

As a result of the direct infeed of the lubricant, the formation and provision of an oil sump is avoided. The infeed takes place in the course of the lubricant supply and can be set by external parameters. The rotation of the differential housing does not produce any splashing losses, as is customary in an oil sump. Furthermore, foaming of the lubricant and excessive distribution are avoided, enabling the quantity of lubricant to be accurately apportioned.

In an embodiment, the differential assembly has a further differential housing, a second cover and a second shaft.

The design with a second housing half makes it possible to install with reduced labor. The second shaft serves to distribute torque which is introduced into the differential with the aid of the first shaft. In this case, the second cover can likewise be equipped with a lubricant channel.

In a further embodiment, the differential housing rotates during operation, with the result that the lubricant is moved in the third lubricant channel by the centrifugal force produced.

The rotation assists the flow in the lubricant circuit. At the same time, the design eliminates the need for an additional enclosing housing since a lubricant level in the lower region is no longer necessary to maintain lubrication.

BRIEF DESCRIPTION OF THE DRAWINGS

The disclosure is furthermore described with reference to the following drawings, in which.

DETAILED DESCRIPTION

Figure 1:
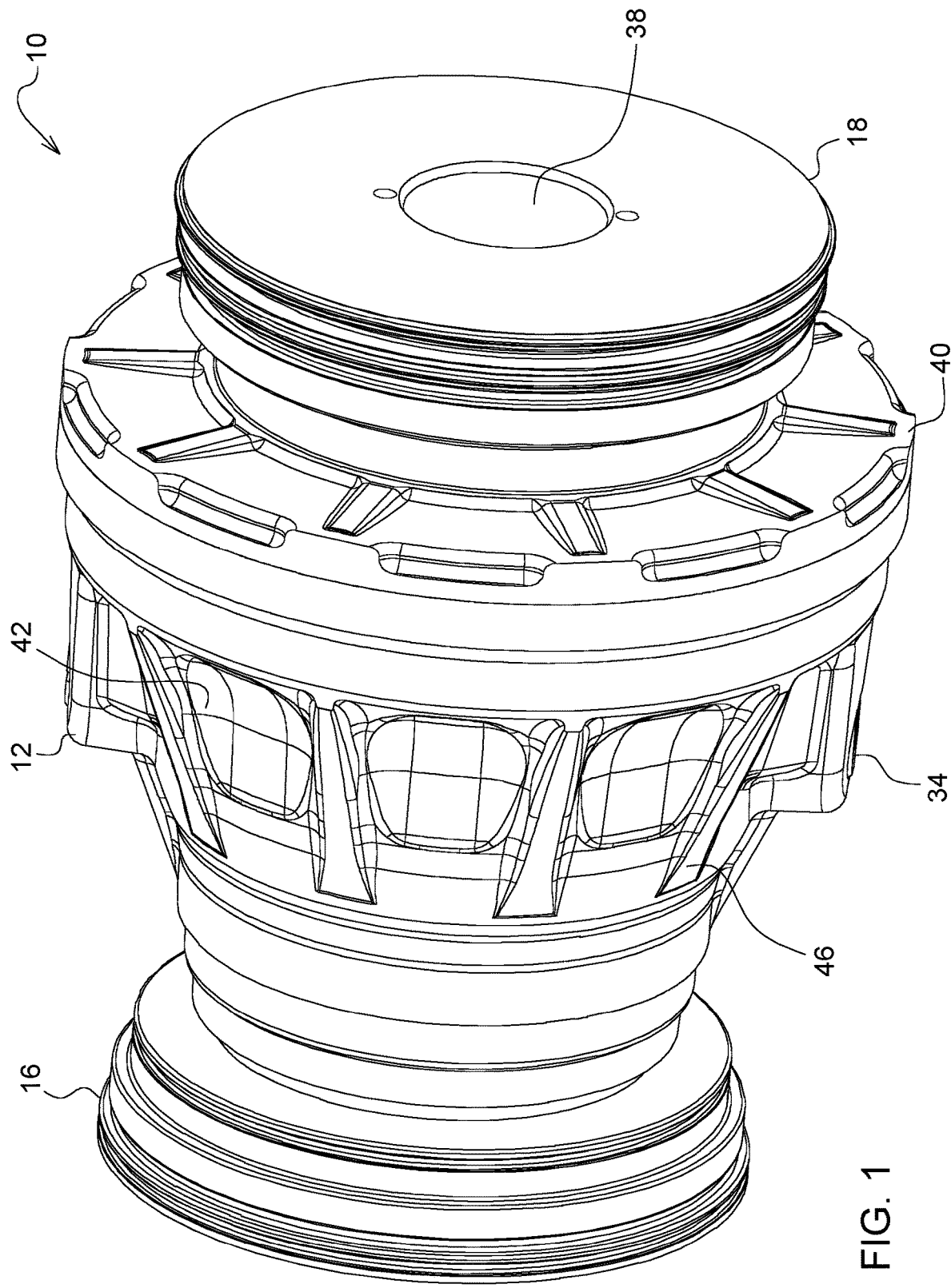
FIG. 1 shows an overall view of one embodiment of the disclosure.

FIG. 1 illustrates a differential assembly 10 according to the disclosure. In one embodiment, the differential assembly 10 includes differential housings 12 and 40. These enclose a differential which comprises a plurality of shafts and gearwheels. On an outer side of the differential housing 12, the axle 34 projects out of the interior and is held in the differential housing 12. Two covers 16 and 18 are attached to both ends of the differential assembly 10. These hold rolling bearings 14 in position and press them against the differential housings 12 and 40. Extending through the covers 16, 18 are two shafts 36, 38, which in turn provide gearwheels in the differential. Further features are described together with FIG. 2.

Figure 2:
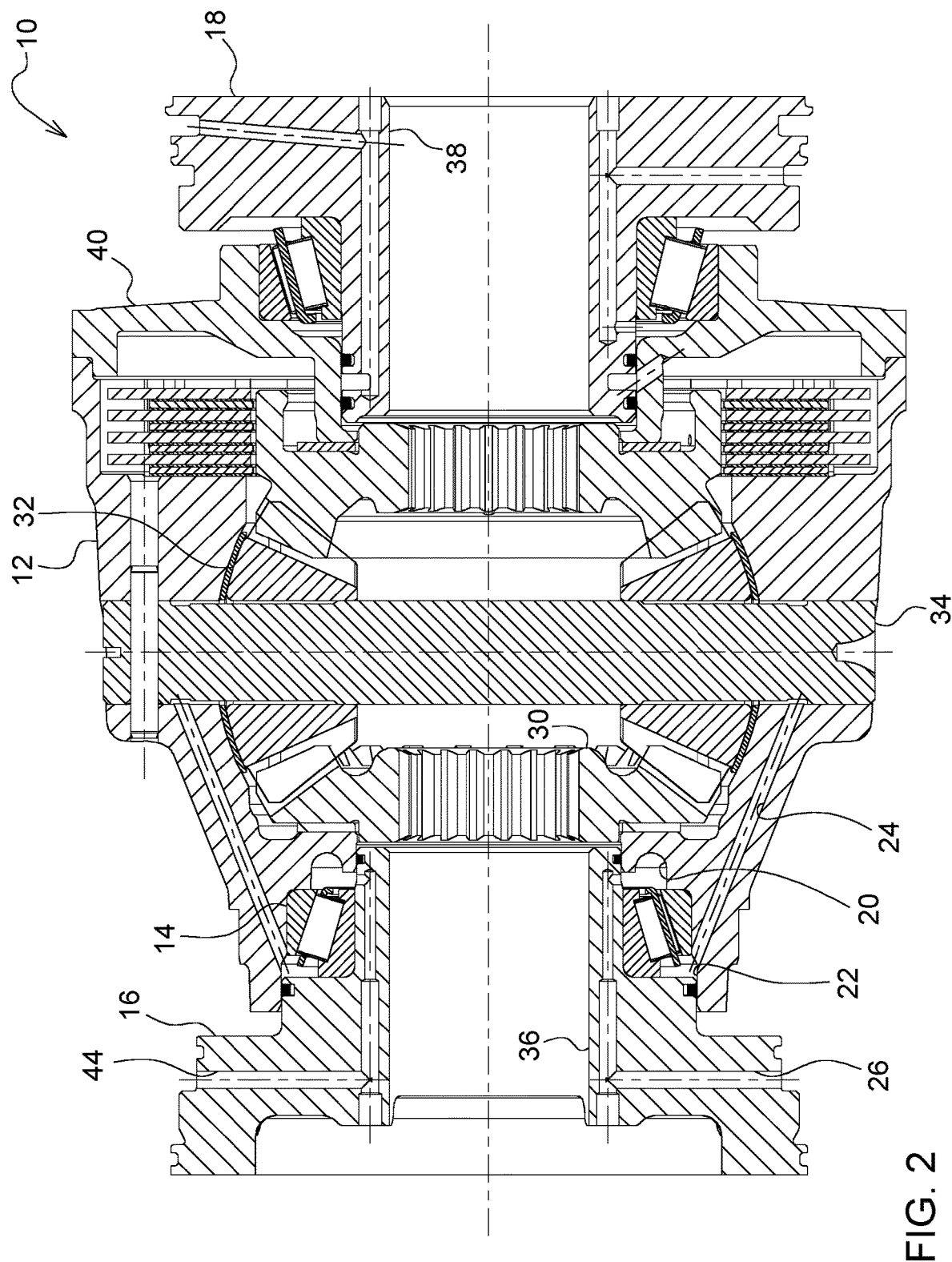
FIG. 2 shows a sectional view of one embodiment of the disclosure.

FIG. 2 shows a sectional view of the disclosure.

The differential assembly 10 includes two differential housings 12 and 40, which are of symmetrical design with respect to a central axis of rotation. A first and second cover 16, 18, each of which fixes a rolling bearing 14 on the differential housings 12, 40, are fastened to both axial ends. At one horizontal end of the differential housing 12, the latter has a recess for receiving the rolling bearing 14. On a side of the rolling bearing 14 which faces away from the end, a shoulder or channel which runs around the entire bearing side is formed in the differential housing 12, there being a cavity between the rolling bearing 14 and the differential housing 12, which cavity forms the first lubricant channel 20.

The rolling bearing 14 is supported by an outer ring side on the differential housing 12 and by an inner ring side on the cover 16. The cover 16 has a connection 44, which is connected to a lubricant supply and carries lubricant through the cover 16 with the aid of channels 26 into the first lubricant channel 20. Via the first lubricant channel 20, the lubricant comes into direct contact with the rolling bearing 14. The cover 16 is sealed off from the differential housing 12 by a seal, ensuring that no lubricant escapes between the components.

On the side of the rolling bearing 14 which faces the cover 16, a second lubricant channel 22 is formed between the cover 16 and the rolling bearing 14. By virtue of the first and second lubricant channels, the lubricant can flow through the rolling bearing 14.

The differential housing 12 widens in the axial direction in order to enclose the gearwheel in the interior, and the shaft 36, which is connected to the gearwheel 30. The gearwheels 32, which are secured on an axle 34, mesh with gearwheel 30. The axle 34 is secured in the differential housing 12, enabling the gearwheels 32 to rotate with sliding support on the axle 34. The gearwheels 32 mesh with a further gearwheel on a side opposite gearwheel the gearwheel being secured on a second shaft 38. Torque is introduced into the differential assembly 10 via the shaft 36, transmitted to the shaft 38 by the gearwheels 30, 32, converted and output at the cover 18.

The differential housing 12 has a third lubricant channel 24, which is located in a wall section of the second lubricant channel 22. The third lubricant channel 24 can be formed one or more times over the circumference of the differential housing 12. By the third lubricant channel 24, the lubricant is transported from the second lubricant channel 22 into the inner region of the differential assembly 10. In this case, an outlet of the third lubricant channel 24 is located at the axle 34, which has a recess in a diameter region to enable the lubricant to be carried from the differential housing 12 to the surface of the axle 34. Here, the lubricant serves to lubricate the sliding bearing of the gearwheels 32, which are rotatably mounted on the axle 34.

FIG. 2 also shows a multi-disk clutch in the differential, by which the gearwheels 32 can be locked, such that the output speed at cover 18 is identical to the input speed at cover 16.

The second cover 18 can likewise have a connection for the lubricant supply. The connection carries the lubricant to an inner side of the rolling bearing, in a manner corresponding to the connection in the first cover 16, and at the same time to a further opening on the inner side of the differential housing 40 in order to supply the multi-disk clutch with lubricant.

On its outer side in the region of the third lubricant channel 24, the differential housing 12 can have reinforcing ribs or thickened portions, in which the third lubricant channel 24 is accommodated. The circumferential regions between the reinforcing ribs or thickened portions can be embodied with a smaller wall thickness, or can have gaps, which are embodied as openings and have no material. It is thereby possible to maximize the weight reduction.

Both differential housings 12, 40 can be screwed together, making it possible to open the differential assembly 10 for maintenance purposes.

The lubricant enters the differential assembly 10 through the connection in the cover 16 and is carried to the side of the rolling bearing 14 which faces away from the cover 16. There, the lubricant is distributed through the first lubricant channel 20 on the circumference of the differential housing 12 and of the rolling bearing 14 and flows through the rolling bearing 14 onto the side of the rolling bearing 14 which faces the cover 16 and into the second lubricant channel 22.

Subsequently, the lubricant flows into the third lubricant channel 24, a centrifugal force being produced by the rotation about the longitudinal axis (axis of symmetry) of the differential assembly 10 and assisting the lubricant during transport. The lubricant exits from the inner side of the differential housing 12 and flows to the axle 34 and the gearwheels 32.

In this way, the differential assembly 10 is supplied with lubricant without using an oil sump. As a result of the design of the lubricant channels, a high wall thickness of the differential housings 12, 40 can be dispensed with and the differential assembly 10 can be embodied as a lightweight variant, and at the same time the lubricating function can be maintained. The disclosure makes it possible to save weight in the vehicle and to ensure lubrication, which in turn results in an improved service life of the differential assembly 10, on the one hand by virtue of the reduced wear, and on the other hand by virtue of the protection against corrosion and environmental influences. As a result of the lubrication, an oil sump and splashing of the differential assembly 10 are no longer necessary; at the same time, further efficiency losses in the drive train are reduced.

The lubricant connection can be a pressure oil connection, which is supplied with lubricant under pressure by an oil pump.

The differential assembly 10 can have at least one gearwheel 32 on the axle 34. It is furthermore possible to dispense with the output gearwheel and the output shaft 38 if the differential housing 12 or 40 in each case has external toothing for the output.

The axle 34 can be embodied as a continuous axle, such that it is held on two opposite sides of the differential housing 12. The axle can also be formed with axle sections, such that the sections are each held individually on one side on opposite sides of the differential housing 12. In a further embodiment, the differential assembly 10 can have not just two gearwheels, but four gearwheels, each of which is held on an axle section in the differential housing 12 at a 90° angle to one another. In this way, a higher torque can be supported and used.

The invention claimed is:

1. A differential assembly comprising:
   a differential housing supporting at least a first shaft having a first gearwheel, the differential housing designed to be connected to a lubricant supply;
   a rolling bearing for mounting the first shaft;
   a cover fixed to the differential housing and fixing the rolling bearing to the differential housing;
   a circumferential first lubricant channel formed in the differential housing between the first gearwheel and the rolling bearing on a first side of the rolling bearing;
   a circumferential second lubricant channel formed between the cover and the rolling bearing on a second side of the rolling bearing; and
   an inner third lubricant channel formed in the differential housing and extending from the second lubricant channel within a wall of the differential housing as far as an inner side of the differential housing;
   wherein lubricant flows from the first lubricant channel in a first direction away from the interior of the differential housing through the rolling bearing into the second lubricant channel and then in a different second direction through the third lubricant channel and into the interior of the differential housing.

2. The differential assembly of claim 1, wherein the cover has a connection to the lubricant supply.

3. The differential assembly of claim 2, wherein the cover has a fourth lubricant channel, which carries lubricant from the connection into the first lubricant channel.

4. The differential assembly of claim 1, wherein the lubricant is moved in the third lubricant channel via centrifugal force.

5. The differential assembly of claim 1, further comprising:
   an axle with second and third gearwheels, wherein the second and third gearwheels mesh with one another, and wherein the axle and the first shaft are mounted at a 90° angle to one another in the differential housing.

6. The differential assembly of claim 5, wherein lubricant is carried to the axle by the third lubricant channel.

7. The differential assembly of claim 1, further comprising:
   a second differential housing;
   a second cover; and
   a second shaft.

8. The differential assembly of claim 2, wherein the connection is designed for operation with a lubricant pump.

* * * * *